United States Patent [19]

Meyer

[11] Patent Number: 5,432,686
[45] Date of Patent: Jul. 11, 1995

[54] HANDLE CONTROL MEANS FOR SPOTLIGHTS ON AUTOMOTIVE VEHICLES

[75] Inventor: Bruce A. Meyer, Richmond, Tex.

[73] Assignee: Linear Solutions, Inc., Richmond, Tex.

[21] Appl. No.: 315,546

[22] Filed: Sep. 30, 1994

[51] Int. Cl.⁶ .............................................. B60Q 1/00
[52] U.S. Cl. ....................................... 362/74; 362/66; 362/285; 362/421
[58] Field of Search ............... 362/66, 74, 80, 285, 362/287, 269, 271, 275, 419, 421

[56] References Cited

U.S. PATENT DOCUMENTS

| | | | |
|---|---|---|---|
| 1,492,682 | 5/1924 | Foster | 362/421 |
| 1,612,960 | 1/1927 | Anderson | 362/66 |
| 4,419,721 | 12/1983 | Gregoire et al. | 362/80 X |
| 5,217,291 | 6/1993 | Meyer | 362/421 X |

*Primary Examiner*—Stephen F. Husar
*Attorney, Agent, or Firm*—Bush, Moseley, Riddle & Jackson

[57] ABSTRACT

A hand operated spotlight assembly (10) for mounting on a roof (R) of an automotive vehicle including inner and outer hemispherical mounting members (20, 21) fixed on opposed sides of the roof (R). Inner and outer movable frames (12, 14) are mounted on the fixed mounting members (20, 21) in a ball and socket connection for relative rotative and tilting movements upon actuation of a handle (50). An actuating member (66) is mounted for pivotal movement about a fixed pivot (68) on the handle (50) and upon movement of a lever (56) and a cooperating link (60) draws inner and outer movable members (12, 14) into tight frictional engagement with fixed mounting members (20, 21). The handle (50) is formed of a pair of handle halves (48A, 48B) which are secured to each other about a control mechanism (56, 60, 66, 84). A rod receiving member (44) secured to inner mounting frame (12) receives a rod (40) on outer movable frame (14) and fits around bosses (82) to hold halves (48A, 48B) together in assembled relation about the control mechanism (56, 60, 66, 84).

11 Claims, 4 Drawing Sheets

HANDLE CONTROL MEANS FOR SPOTLIGHTS ON AUTOMOTIVE VEHICLES

BACKGROUND OF THE INVENTION

1. Field of the Invention

This invention relates to a spotlight assembly mounted on the roof of an automobile vehicle, and more particularly to handle control means for permitting movement of the spotlight assembly to a desired position.

2. Prior Art

U.S. Pat. No. 5,217,291 dated Jun. 8, 1993 is directed to a hand operated spotlight assembly mounted on the roof of an automotive vehicle and having a manually actuated handle accessible from the interior of the vehicle. The handle is adapted to be manually gripped for rotative and tilting movements of the lamp unit for directing a light beam in a desired position. Inner and outer hemispherically shaped mounting members are fixed to opposed sides of the roof and inner and outer movable frames fit over the fixed mounting members which form bearing surfaces and generally provide a ball and socket joint. A lamp unit is mounted on the outer movable frame and a handle is secured to the inner movable frame. The handle is gripped manually and rotated or tilted for simultaneous rotating or tilting the lamp unit. When not in use, the handle is moved to an inoperable position in which the movable frames are held in tight frictional contact against the associated fixed hemispherical mounting members to prevent movement of the handle and lamp unit.

A lever is pivotally mounted on the handle and effects movement of a cam into camming relation with a connecting member for the inner and outer movable frames for tensioning the connecting member to draw the outer movable frame tightly against the fixed inner mounting member for restricting movement of the spotlight assembly. The lever moves past a dead center position when the camming member is moved into tight camming relation with the connecting member thereby to releasably lock the lever and handle in an inoperable position with the movable frame being held in tight functional contact against the fixed hemispherical bearing surfaces. To release the handle from its inoperable position, the lever is pushed manually to pull the cam from its tight engagement with the connecting member. A substantial pushing force is oftentimes required in order to release the cam from engagement. Also movement of the cam by the lever into the releasably locked position of the handle oftentimes requires a substantial gripping action against the lever by an operator of the spotlight assembly. Thus, a user or operator of the wedge or cam mechanism in the spotlight assembly shown in my prior U.S. Pat. No. 5,217,291 dated Jun. 8, 1993 oftentimes exerts a substantial effort in the engagement and disengagement of the cam mechanism for movement between operable and inoperable positions of the handle.

SUMMARY OF THE INVENTION

The present invention is particularly directed to a handle control means for the spotlight assembly in which the handle is easily engaged in a releasably locked inoperable position and easily released or unlocked in an operable position for movement of the spotlight to a desired location for direction of the light beam. An object of the invention is the provision of a handle control mechanism having an over-center design that is easily engaged and released. The handle control mechanism fits within a compact, low profile handle shape that folds near the roof when not in use. The operating members are accessible along the upper surface of the handle where an operator positions his fingers during movements of the handle. The mechanical advantage of the linkage for the control mechanism allows the lever to be easily depressed while providing a significant increase in drag to the ball and socket mounting for the spotlight assembly. An adjustable set screw allows the over-center stop point for the linkage to be set so that a light touch is sufficient to disengage the actuating member of the linkage.

Another object of this invention is to provide the handle assembly with safety features. With the control surfaces for the control mechanism on the top side of the handle adjacent the roof, the control mechanism is not inadvertently actuated by a vehicle occupant who might accidentally come in contact with the handle. The smooth handle body has no sharp or hard edges and the handle body is molded from a thermoplastic material with elastic properties. The elastic properties allow the handle to flex on impact for release of the control mechanism from a releasably locked inoperable position to permit movement of the handle thereby minimizing possible injury.

It is a further object of this invention to provide a handle body fabricated in two halves that unite to form the inner movable frame of an outer convex shape while enclosing the control mechanism in a smooth, rounded, hand conforming body. The handle body halves allow the control mechanism to be first installed in one half prior to the mounting of the mating half of the handle body.

Other features, advantages and objects of the invention will become more apparent after referring to the following specification and drawings.

DESCRIPTION OF THE INVENTION

Figure 1:
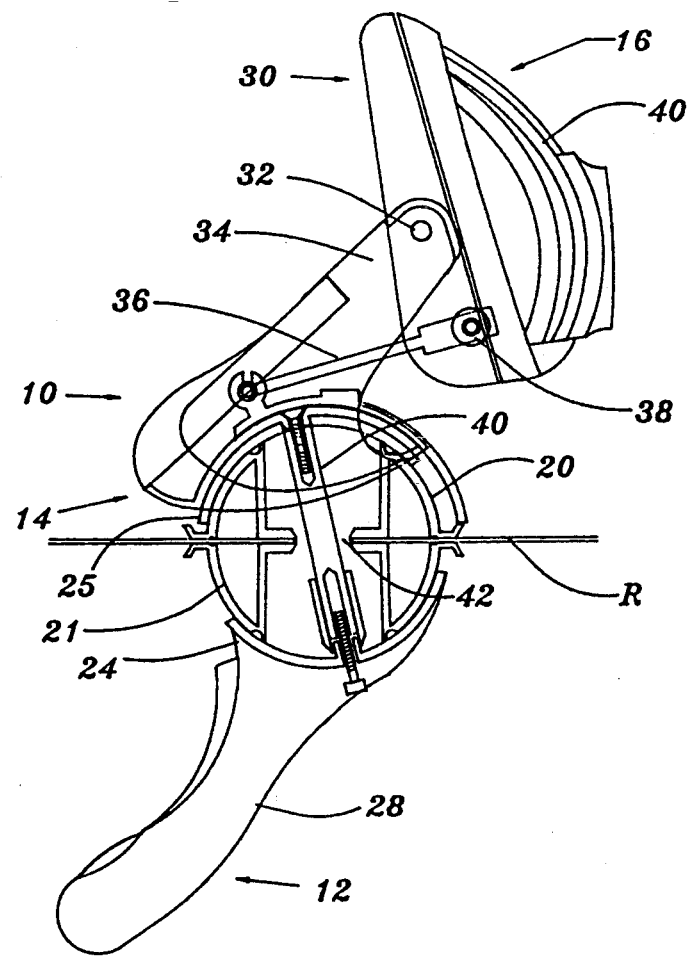
FIG. 1 is a side elevation of the spotlight assembly comprising the present invention with the lamp unit shown in an erect operable position on the roof of an automotive vehicle.
Figure 2:
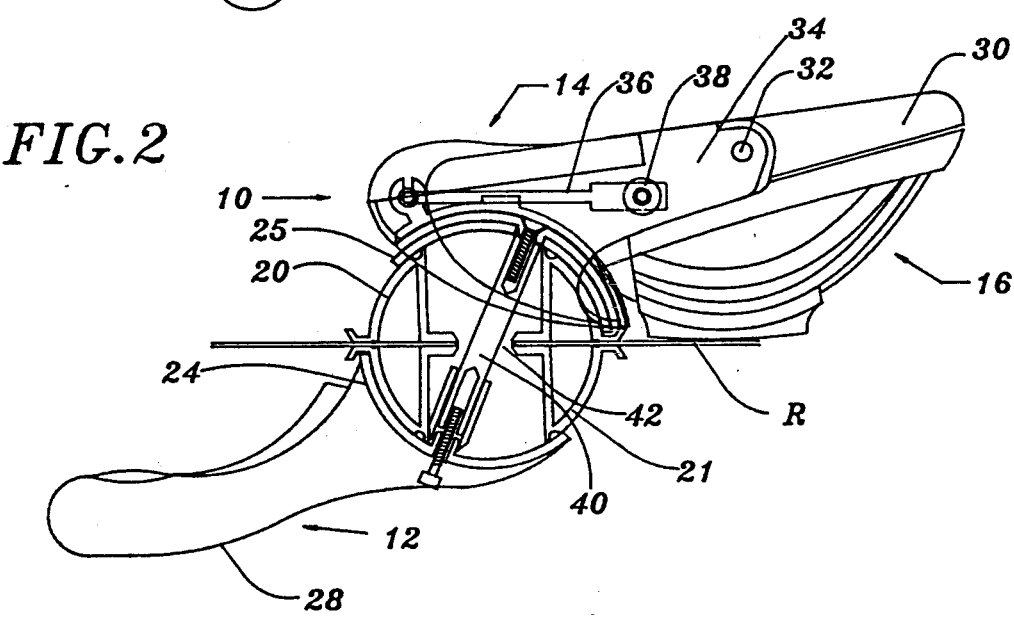
FIG. 2 is a side elevation of the spotlight assembly of FIG. 1 but showing the lamp unit in a retracted inoperable position facing in a generally vertical direction.

Referring to the drawings for a better understanding of this invention and more particularly to FIGS. 1 and 2, a spotlight assembly is shown generally at 10 mounted on the roof R of an automotive vehicle. Spotlight assembly 10 includes an inner movable frame 12 on the inner side of roof R and an outer movable frame 14 on the upper or outer side of roof R. A lamp unit or lamp assembly generally indicated at 16 is mounted on outer movable frame 14 for tilting and rotative movements. A pair of fixed hemispherical mounting members 20 and 21 are secured to respective outer and inner sides of roof R. Inner movable frame 12 has a concave bearing member 24 mounted on inner hemispherical member 21 for rotative and tilting movements. Outer movable frame 14 has a concave bearing member 25 mounted on outer hemispherical member 20 for rotative and tilting movements. Mounting members 20, 21 and concave bearing members 24, 25 generally form a ball and socket joint.

Lamp unit 16 has an outer lens holder or retaining frame 30 including opposed pivotal connections 32 for pivotal mounting of lamp unit 16 between arms of outer movable frame 14. A generally U-shaped link 34 carried by outer movable frame 14 is pivotally mounted at its ends to opposed sides of lens holder 30 at 32 for positioning lamp unit 16 at a desired tilted relationship to outer frame 14. Lamp unit 16 may be rotated 360 degrees about an entire circle and may be tilted in a generally vertical plane around 130 degrees. For further details of spotlight assembly 10, reference is made to aforementioned U.S. Pat. No. 5,217,291 dated Jun. 8, 1993, the entire disclosure of which is incorporated by this reference.

For controlling the movement of lamp unit 16, outer movable frame 14 is connected to inner movable frame 12 for simultaneous movement. For that purpose, a connecting shaft or rod 40 is secured to outer movable frame 14 and extends through an opening 42 in roof R. A cooperating rod receiving member 44 is secured to inner mounting frame 12 by a pair of bolts 46 and preferably is formed of a metallic material. Bolts 46 extend through suitable openings 45 in concave bearing member 24 and are threaded within internal threaded openings 43 in rod receiving member 44. Rod receiving member 44 has an opening 47 therein of a rectangular cross section and the end of rod 40 fitting within receiving member 44 is of a rectangular cross-section so that movement of inner movable member 12 effects a simultaneous movement of outer movable member 14 through connecting members 40 and 44 for tiling and rotative movements.

Figure 3:
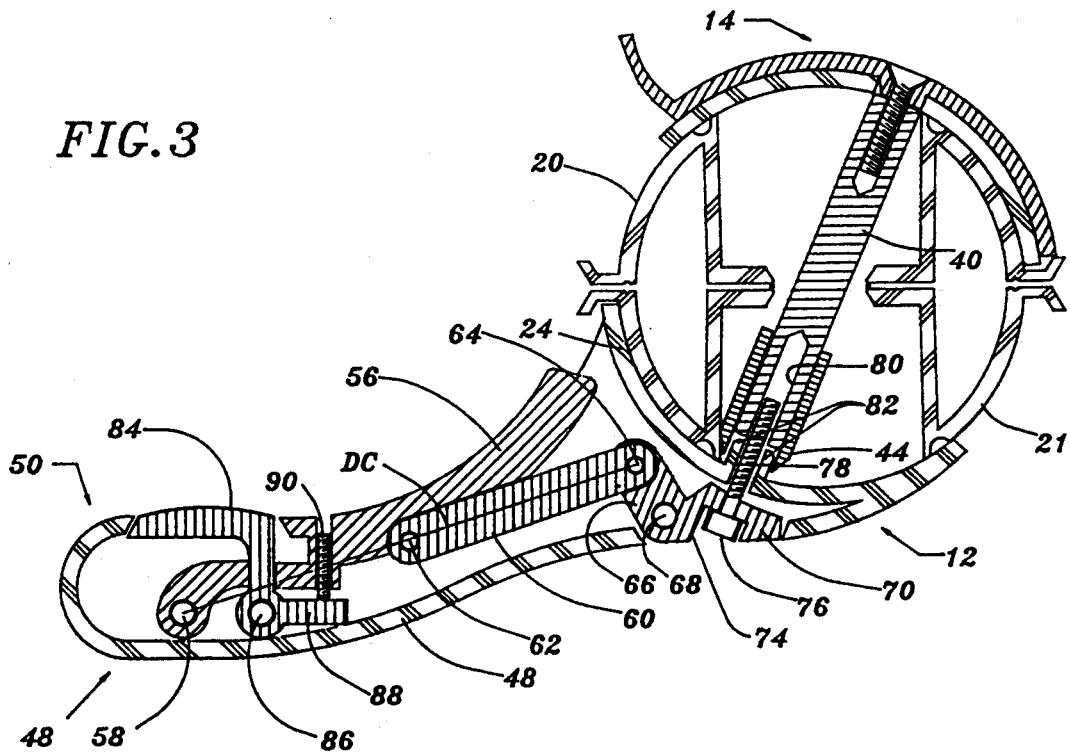
FIG. 3 is an enlarged longitudinal sectional view of the handle assembly illustrating the handle control mechanism in a releasably locked position with the control mechanism shown in an engaged position when the spotlight assembly is not in use.
Figure 4:
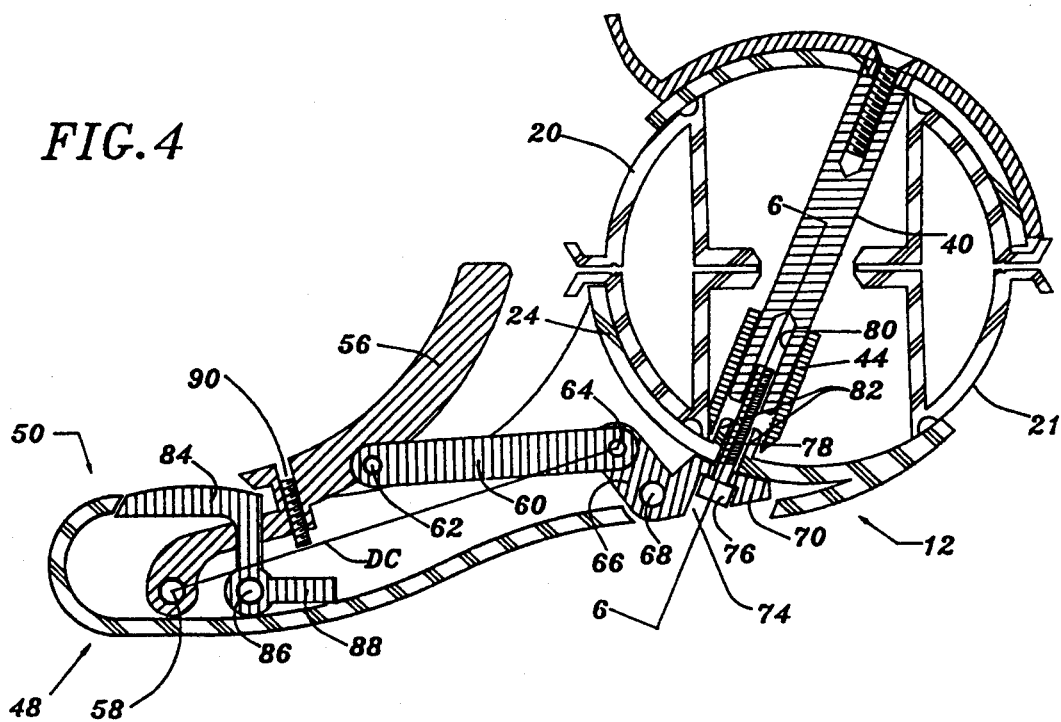
FIG. 4 is an enlarged sectional view of the handle assembly similar to FIG. 3 but showing the handle control mechanism released to a disengaged position to permit movement of the handle and lamp unit to a desired position.

Inner movable frame 12 particularly as shown in FIGS. 3 and 4 has an outer body 48 defining a handle portion 50 and a concave bearing member 24 on an end of handle 50. Body 48 comprises two halves 48A and 48B formed of a suitable thermoplastic material. Body 48 is of a rounded outer surface and concave bearing member 24 fits over the hemispherical bearing surface of fixed mounting member 21 for relative movement upon manual actuation of handle 50. Body halves 48A and 48B are hollow to provide a housing space for the control mechanism for handle 50. The control mechanism includes a lever 56 mounted about a fixed pivot 58 on handle 50. A link 60 is mounted at one end to a movable pivot 62 on lever 56 and mounted at an opposed end to a movable pivot 64 on an actuating member generally indicated at 66. Actuating member 66 is of an angle shape mounted for pivotal movement about a fixed pivot 68 on handle body 48. Arm 70 of actuating member 66 has a counterbore 74 which receives the head 76 of an externally threaded bolt 78 which is threaded within an internally threaded opening 80 in rod 40.

Figure 5:
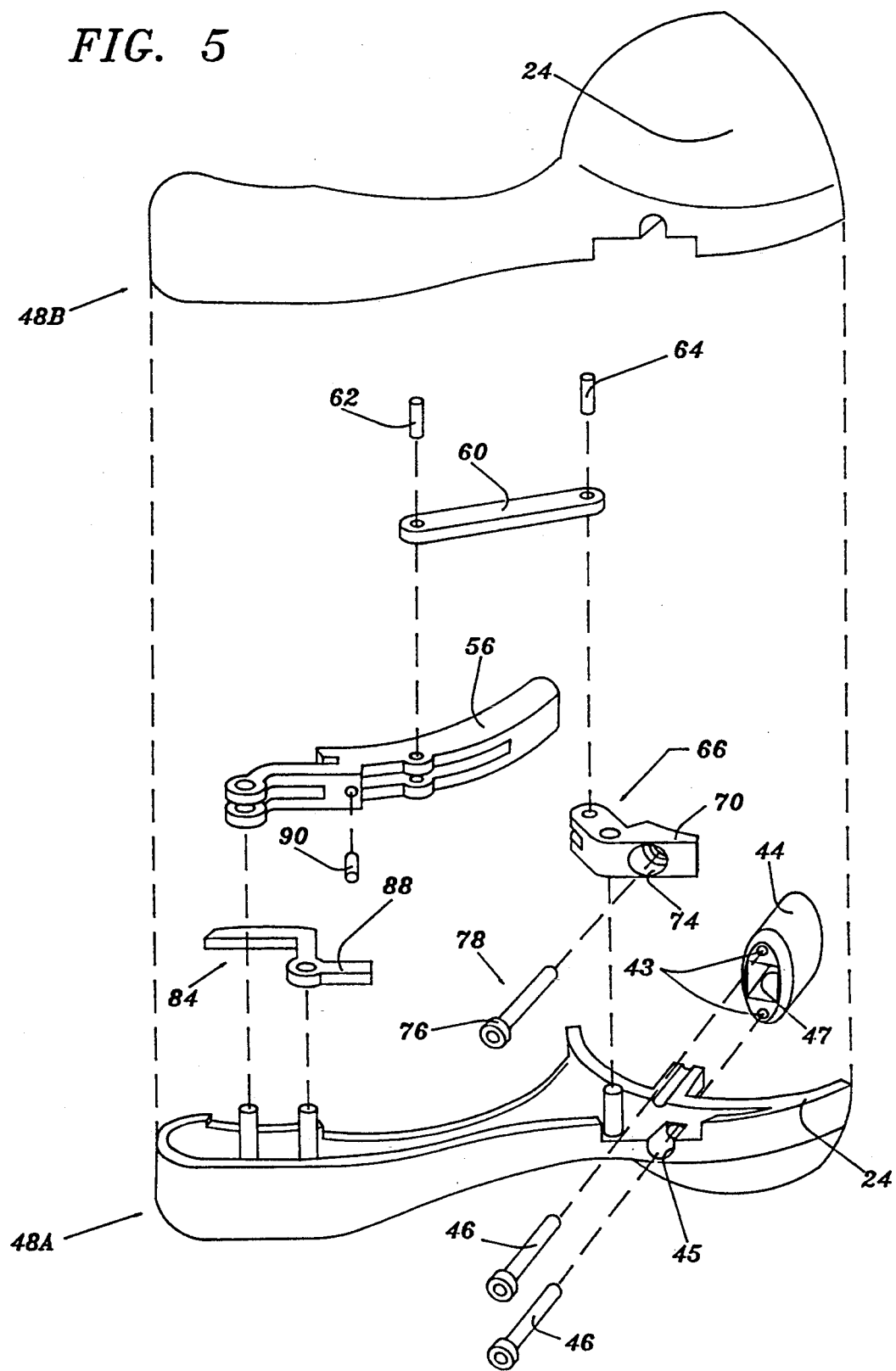
FIG. 5 is an exploded view of the handle assembly removed from the fixed inner mounting member and showing the handle formed of two halves for receiving the control mechanism.
Figure 6:
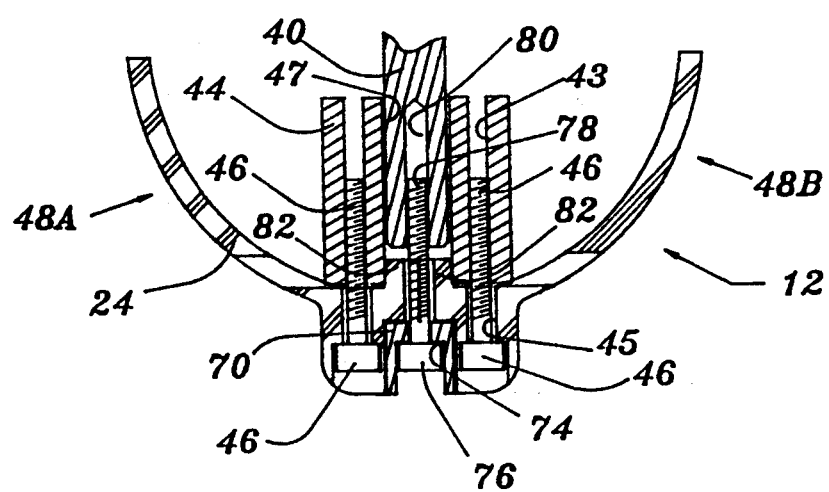
FIG. 6 is a section taken generally along line 6—6 of FIG. 4.

As shown in FIGS. 3–5, each body half 48A, 48B has a boss 82 projecting from the inner surface of concave bearing member 24. Upon securement of rod receiving member 44 by bolts 46, rod receiving member 44 is drawn downwardly onto bosses 82 with bosses 82 being received within the rectangular opening 48 of rod receiving member 44. Handle halves 48A and 48B are held together by rod receiving member 44 fitting in a welding relation over bosses 82 to grip bosses 82 together. A manually depressible release member 84 is pivotally connected about a fixed pivot 86 on handle 50 and has an extending arm 88. Arm 88 contacts set screw 90 on lever 56 in the engaged position of the control mechanism for handle 50 when spotlight assembly 10 is not in use.

As shown in FIG. 3 in which handle 50 is shown in a set engaged position with spotlight unit 10 not in use, link 60 is pivoted by lever 50 past a dead center position as illustrated by line DC with respect to fixed pivot 58 and movable pivot 64. Pivot 62 of link 60 is slightly past the dead center position DC in FIG. 3 and arm 88 of release member 84 is in contact with set screw 90 thereby to limit the inward movement of lever 50 past the dead center position illustrated by line DC. In the position shown in FIG. 3, actuating member 66 is pivoted by link 60 and lever 50 to draw head 76 of bolt 78 outwardly by contact of counterbore 74 with head 76. Since actuating member 66 is mounted about fixed pivot 68, connecting rod 40 secured to bolt 78 is drawn within rod receiving member 44 to urge movable frames 12 and 14 into tight frictional engagement with fixed mounting members 20 and 21 thereby to prevent movement of movable frames 12 and 14 while spotlight assembly 10 is in the position of FIG. 1.

When desired to release actuating member 66 from engagement with bolt 78, handle 50 is gripped by an operator and a finger of the operator contacts depressible member 84 to pivot arm 88 upwardly about fixed pivot 86 into contact with set screw 90 thereby to urge lever 56 upwardly for moving pivot 62 of link 60 away from dead center relation with respect to pivots 58 and 64. In this position, any force acting against bolt 78 by actuating member 66 is released to release the frictional contact between movable frames 12 and 14 and fixed mounting members 20 and 21. In this position, handle 50 may be easily moved by an operator for moving frame 12 to a desired position for directing the light beam from lamp unit 16 in a desired direction. Handle 50 is adapted to rotate frame 14 and lamp unit 30 about a complete circle of 360 degrees. Lamp unit 16 may be tilted about an angle of around 130 degrees as a result of the mechanical advantage obtained by U-shaped link 34 and pivots 36 connected to lamp unit 16. Set screw 90 may be adjusted to determine the sensitivity of link 60 for movement of link 60 from the dead center position. Pressure applied by the fingers of a user gripping handle 50 from the position of FIG. 3 moves lever 56 inwardly for urging link 60 past the dead center position to position handle 50 at a set engaged position in which connecting members 40 and 44 are drawn tightly against fixed mounting members 12 and 14 by tensioning of rod 40 from actuating member 66.

Handle 50 has an outer rounded surface without any sharp or hard edges thereby to provide a smooth gripping surface. As handle body halves 48A and 48B are molded from a thermoplastic material having elastic properties, the handle may flex upon impact which will cause movement of link 60 from the dead center position of FIG. 3 to release actuating member 66 thereby permitting movement of movable frame 12 to minimize any possible injury to an operator or other persons in the automotive vehicle.

The fabrication of handle 50 from a pair of halves 48A and 48B permit the handle assembly to be easily fabricated. Each half 48A, 48B includes a single boss 82 and rod receiver member 44 fits over bosses 82 when halves 48A and 48B are assembled. Rod receiver member 44 is secured by bolts 46 and tightly grips bosses 82 together when assembled with the control mechanism. The control mechanism which includes lever 56, link 60, actuator member 66, and depressible release member 84 is first assembled within half 48A, and then half 48B is secured to half 48A over the control mechanism. An additional fastener, such as a threaded screw, may be provided to secure halves 48A and 48B together if desired. Lever 50 and depressible member 84 are accessible only from the upper surface of handle 50 adjacent roof R and are easily actuated by the fingers of the user in a normal gripping relationship with handle 50. A relatively small force is required for movement of actuator member 66 into and out of engaged position with bolt 78 for tensioning rod 40. The dead center set point for link 60 may be easily determined by set screw 90 and only a slight movement of depressible member 84 is required for unlocking link 60 after it has been pivoted past a dead center position as shown in FIG. 3 at line DC.

While the release member 84 has been shown in the drawings on the upper surface of handle 50, it is to be understood that depressible release member 84 could be accessible from other locations, if desired, such as the lower surface of handle 50. While a preferred embodiment of the present invention is described in detail, it is apparent that modification and adaptions of the preferred embodiment will occur to those skilled in the art. However, it is expressly understood that such modifications and adaptions are within the spirit and scope of the present invention as set forth in the following claims.

What is claimed is:

1. A hand operated spotlight assembly adapted to be mounted on the roof of an automotive vehicle for directing a light beam in a desired direction; said spotlight assembly comprising:
    inner and outer mounting members fixed to opposed sides of said roof and having outer bearing surfaces;
    a movable outer frame mounted for movement on the outer bearing surface of said outer mounting member and a movable inner frame mounted for movement on the outer bearing surface of said inner mounting member;
    a lamp unit mounted on said movable outer frame for movement therewith;
    connecting means between said inner and outer frames to permit simultaneous rotative and tilting movements of said frames relative to said fixed mounting members;
    a handle operatively connected to said movable inner frame and extending outwardly therefrom, said handle adapted to be gripped by an operator of the spotlight assembly to provide rotative and tilting movements of said movable frames relative to said fixed mounting members;
    an actuating member for said connecting means mounted on said handle about a fixed pivot and operatively connected to said connecting means for urging said movable frames into tight engagement against said bearing surfaces of said inner and outer mounting members in an inoperable set position, and for releasing said movable frames from tight engagement against said bearing surfaces in an operable position permitting movement of said lamp unit;
    a lever mounted on said handle for pivotal movement about a fixed pivot and operatively connected to said actuating member for moving said actuating member between operable and inoperable positions of said spotlight assembly; and
    a separate manually depressible release member mounted on said handle about a fixed pivot and adapted when pushed by an operator from an inoperable position of the spotlight assembly to engage said lever for movement of said actuating member to an operable position for releasing said movable frames to permit movement of said lamp assembly to a desired position upon manual actuation of said handle.

2. A hand operated spotlight assembly as set forth in claim 1 wherein:
    a link extends between and is pivotally connected to said lever and to said actuating member about movable pivots, and said link is movable by said lever past a dead center position with respect to said movable pivots and said fixed pivot of said lever in an inoperable position to releasably retain said spotlight assembly in inoperable position.

3. A hand operated spotlight assembly as set forth in claim 2 wherein said connecting means between said inner and outer movable frames comprises a connecting member extending between said movable frames, said actuating member exerting a tension force against said connecting member to urge said outer frame into tight engagement with the associated bearing surface in the inoperable position of said spotlight assembly.

4. A hand operated spotlight assembly as set forth in claim 3 wherein said actuating member includes an extending arm in engagement with said connecting member for exerting an axial force against said connecting member when said arm is pivoted in one direction about said fixed pivot.

5. A hand operated spotlight assembly as set forth in claim 1 wherein said separate manually depressible release member is accessible from the upper surface of said handle adjacent the roof of the automotive vehicle and manually depressed inwardly by the operator upon gripping of the handle thereby to release said actuating member from inoperable set position.

6. A hand operated spotlight assembly adapted to be mounted on the roof of an automotive vehicle for directing light beam in a desired direction; said spotlight assembly comprising:
    inner and outer mounting members fixed to opposed sides of said roof and having outer bearing surfaces;
    a movable outer frame mounted for movement on the outer bearing surface of said outer mounting member and a movable inner frame mounted for movement on the outer bearing surface of said inner mounting member;
    a lamp unit mounted on said movable outer frame for movement therewith;

connecting means between said movable inner and outer frames to permit simultaneous rotative and tilting movements of said frames relative to said fixed mounting members;

a handle operatively connected to said movable inner frame and extending outwardly therefrom, said handle adapted to be gripped by an operator of the spotlight assembly to provide rotative and tilting movement of said movable frames relative to said fixed mounting members; and handle control means permitting said movable frames to be drawn tightly into frictional engagement with said fixed mounting members to prevent movement thereof in one position and releasing said movable inner and outer frames from tight frictional contact with said fixed mounting members in another position thereof;

said handle control means including a control mechanism for moving said inner and outer frames between said positions;

said handle and said movable inner frame formed of a pair of mating halves providing a hollow space therebetween; said control mechanism being mounted within said hollow space with said handle halves being connected about said control mechanism and forming said movable inner frame.

7. A hand operated spotlight assembly as set forth in claim 6 wherein said connecting means comprises a rod secured to said outer mounting frame and a rod receiving member secured to said inner mounting frame;

said handle halves each having a boss projecting toward said movable outer frame, and said rod receiving member engages the bosses for said handle halves to grip said bosses for securing said handle halves to each other in assembled relation.

8. A hand operated spotlight assembly adapted to be mounted on the roof of an automotive vehicle for directing a light beam in a desired direction; said spotlight assembly comprising:

inner and outer mounting members fixed to opposed sides of said roof and having outer bearing surfaces;

a movable outer frame mounted for movement on the outer bearing surface of said outer mounting member and a movable inner frame mounted for movement on the outer bearing surface of said inner mounting member;

a lamp unit mounted on said movable outer frame for movement therewith;

connecting means between said inner and outer frames to permit simultaneous rotative and tilting movements of said frames relative to said fixed mounting members;

a handle operatively connected to said movable inner frame and extending outwardly therefrom, said handle adapted to be gripped by an operator of the spotlight assembly to provide rotative and tilting movements of said movable frames relative to said fixed mounting members;

an actuating member for said connecting means mounted on said handle about a fixed pivot and operatively connected to said connecting means for urging said movable frames into tight engagement against said bearing surfaces of said inner and outer mounting members in an inoperable set position, and for releasing said movable frames from tight engagement against said bearing surfaces in an operable position permitting movement of said lamp unit;

a lever mounted on said handle for pivotal movement about a fixed pivot and operatively connected to said actuating member for moving said actuating member between operable and inoperable positions of said spotlight assembly; and a separate manually depressible release member mounted on said handle about a fixed pivot and adapted when pushed by an operator from an inoperable position of the spotlight assembly to engage said lever for movement of said actuating member to an operable position for releasing said movable frames to permit movement of said lamp assembly to a desired position upon manual actuation of said handle.

9. A hand operated spotlight assembly as set forth in claim 8 wherein said link is pivotally connected to said lever and to said actuating member about movable pivots, and said link is movable by said lever past a dead center position with respect to said movable pivots in the inoperable position to releasably retain said spotlight assembly in inoperable position.

10. A hand operated spotlight assembly as set forth in claim 9 wherein a manual release member is operatively connected to said link to pivot said link from its inoperable position from its dead center position to permit said actuating member to pivot about said fixed pivot away from urging relation with said movable members to permit operation of said spotlight assembly.

11. A hand operated spotlight assembly as set forth in claim 10 wherein said manual release member comprises a manually depressible member mounted on said handle about a fixed pivot and adapted when pushed by an operator from an inoperable position of the spotlight assembly to engage said lever for pivoting of said link through a dead center position for releasing said actuating member from the inoperable position of said spotlight assembly.

* * * * *